United States Patent
Chuang et al.

(10) Patent No.: US 9,894,382 B2
(45) Date of Patent: Feb. 13, 2018

(54) METHOD AND APPARATUS FOR ASSIGNING MOTION VECTOR PREDICTOR TO SUB-BLOCK WITHOUT PERFORMING ASSOCIATED ITERATION OF SUB-BLOCK MOTION VECTOR PREDICTOR DETERMINATION FLOW

(71) Applicant: MEDIATEK INC., Hsin-Chu (TW)

(72) Inventors: Shun-Hsiang Chuang, Taipei (TW); Chih-Ming Wang, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 113 days.

(21) Appl. No.: 14/753,004

(22) Filed: Jun. 28, 2015

(65) Prior Publication Data

US 2016/0021387 A1 Jan. 21, 2016

Related U.S. Application Data

(60) Provisional application No. 62/026,084, filed on Jul. 18, 2014.

(51) Int. Cl.
*H04N 7/12* (2006.01)
*H04N 19/593* (2014.01)
(Continued)

(52) U.S. Cl.
CPC ......... *H04N 19/593* (2014.11); *H04N 19/119* (2014.11); *H04N 19/176* (2014.11); *H04N 19/52* (2014.11)

(58) Field of Classification Search
CPC .................................................. H04N 19/593
(Continued)

(56) References Cited

U.S. PATENT DOCUMENTS

2013/0070857 A1* 3/2013 Kondo ............ H04N 19/00696
375/240.16

FOREIGN PATENT DOCUMENTS

| CN | 1589024 A | 3/2005 |
| CN | 101072356 A | 11/2007 |

(Continued)

OTHER PUBLICATIONS

"International Search Report" dated Oct. 20, 2015 for International application No. PCT/CN2015/084190, International filing date: Jul. 16, 2015.

*Primary Examiner* — Richard Torrente
(74) *Attorney, Agent, or Firm* — Winston Hsu

(57) ABSTRACT

A motion vector predictor determination method includes: checking if motion vector data of at least one first neighbor unit adjacent to a block and motion vector data of at least one second neighbor unit adjacent to the block are identical to each other; and when a checking result indicates that the motion vector data of the at least one first neighbor unit is identical to the motion vector data of the at least one second neighbor unit, assigning a motion vector predictor determined for a first sub-block within the block to a second sub-block within the block. The motion vector data of the at least one first neighbor unit is involved in determining the motion vector predictor of the first sub-block, and the motion vector data of the at least one second neighbor unit is not involved in determining the motion vector predictor of the first sub-block.

10 Claims, 20 Drawing Sheets

(51) Int. Cl.
*H04N 19/52* (2014.01)
*H04N 19/176* (2014.01)
*H04N 19/119* (2014.01)

(58) Field of Classification Search
USPC .................................................. 375/240.16
See application file for complete search history.

(56) References Cited

FOREIGN PATENT DOCUMENTS

WO  2011077632 A1  6/2011
WO  2012090397 A1  7/2012

\* cited by examiner

| $nb_{b3}$ | $nb_{b0}$ | $mi_b$ |
|---|---|---|
| $nb_{b5}$ | $nb_{b2}$ | $nb_{b1}$ |
| $nb_{b7}$ | $nb_{b6}$ | $nb_{b4}$ |

| $nb_{a3}$ | $nb_{a0}$ | $mi_a$ |
|---|---|---|
| $nb_{a5}$ | $nb_{a2}$ | $nb_{a1}$ |
| $nb_{a7}$ | $nb_{a6}$ | $nb_{a4}$ |

FIG. 3

MI unit size = 16x8

(A)

MI unit size = 8x8

(B)

METHOD AND APPARATUS FOR ASSIGNING MOTION VECTOR PREDICTOR TO SUB-BLOCK WITHOUT PERFORMING ASSOCIATED ITERATION OF SUB-BLOCK MOTION VECTOR PREDICTOR DETERMINATION FLOW

CROSS REFERENCE TO RELATED APPLICATIONS

This application claims the benefit of U.S. provisional application No. 62/026,084, filed on Jul. 18, 2014 and incorporated herein by reference.

BACKGROUND

The disclosed embodiments of the present invention relate to video frame processing, and more particularly, to a method and apparatus for assigning a motion vector predictor to a sub-block within a block (e.g., a 4×4 sub-block, a 8×4 sub-block or a 4×8 sub-block within an 8×8 block) without performing an associated iteration of a sub-block motion vector predictor determination flow.

The conventional video coding standards generally adopt a block based coding technique to exploit spatial and temporal redundancy. For example, the basic approach is to divide the whole source frame into a plurality of blocks, perform prediction on each block, transform residues of each block using discrete cosine transform, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

Motion vectors are used by motion compensation to reconstruct the inter-frames. With regard to a video decoder, a motion vector (MV) of a current block may be derived from a motion vector predictor (MVP) and a motion vector difference (MVD). For example, the computation of the motion vector may be expressed using the following equation:

$$MV=MVP+MVD,$$

where the MVP of the current block may be determined from motion vector data of neighbor reconstructed blocks, and the MVD may be decoded from a bitstream by a variable length decoder (VLD).

The performance of the motion vector computation depends on the computation of the motion vector predictor. Consider a case where a small-sized block is further subdivided into a plurality of sub-blocks, it may require extra time to find a motion vector predictor for each of the sub-blocks within the same block. This may induce considerable timing overhead if an inter-frame is composed of a large number of sub-blocks. Thus, there is a need for an innovative design which is capable of effectively improving the speed of the MVP determination.

SUMMARY

In accordance with exemplary embodiments of the present invention, a method and apparatus for assigning a motion vector predictor to a sub-block within a block (e.g., a 4×4 sub-block, a 8×4 sub-block or a 4×8 sub-block within an 8×8 block) without performing an associated iteration of a sub-block motion vector predictor determination flow are proposed to solve the above-mentioned problem.

According to a first aspect of the present invention, an exemplary motion vector predictor determination method is disclosed. The exemplary motion vector predictor determination method includes: checking if motion vector data of at least one first neighbor unit adjacent to a block and motion vector data of at least one second neighbor unit adjacent to the block are identical to each other; and when a checking result indicates that the motion vector data of the at least one first neighbor unit is identical to the motion vector data of the at least one second neighbor unit, assigning a motion vector predictor determined for a first sub-block within the block to a second sub-block within the block. The motion vector data of the at least one first neighbor unit is involved in determining the motion vector predictor of the first sub-block, and the motion vector data of the at least one second neighbor unit is not involved in determining the motion vector predictor of the first sub-block.

According to a second aspect of the present invention, an exemplary motion vector predictor determination method is disclosed. The exemplary motion vector predictor determination method includes: determining a motion vector predictor of a block according to motion vector data of neighbor units associated with the block; and assigning the motion vector predictor determined for the block to a first sub-block within the block.

According to a third aspect of the present invention, an exemplary motion vector predictor determination apparatus is disclosed. The exemplary motion vector predictor determination apparatus includes a checking circuit and a motion vector predictor computing circuit. The checking circuit is arranged to check if motion vector data of at least one first neighbor unit adjacent to a block and motion vector data of at least one second neighbor unit adjacent to the block are identical to each other. The motion vector predictor computing circuit is arranged to assign a motion vector predictor determined for a first sub-block within the block to a second sub-block within the block when the checking circuit determines that the motion vector data of the at least one first neighbor unit is identical to the motion vector data of the at least one second neighbor unit, wherein the motion vector data of the at least one first neighbor unit is involved in determining the motion vector predictor of the first sub-block, and the motion vector data of the at least one second neighbor unit is not involved in determining the motion vector predictor of the first sub-block.

According to a fourth aspect of the present invention, an exemplary motion vector predictor determination apparatus is disclosed. The exemplary motion vector predictor determination apparatus includes a motion vector predictor computing circuit. The motion vector predictor computing circuit is arranged to determine a motion vector predictor of a block according to motion vector data of neighbor units associated with the block, and assign the motion vector predictor determined for the block to a first sub-block within the block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating an example of two VP9 MI units with the same size and same reference frame.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
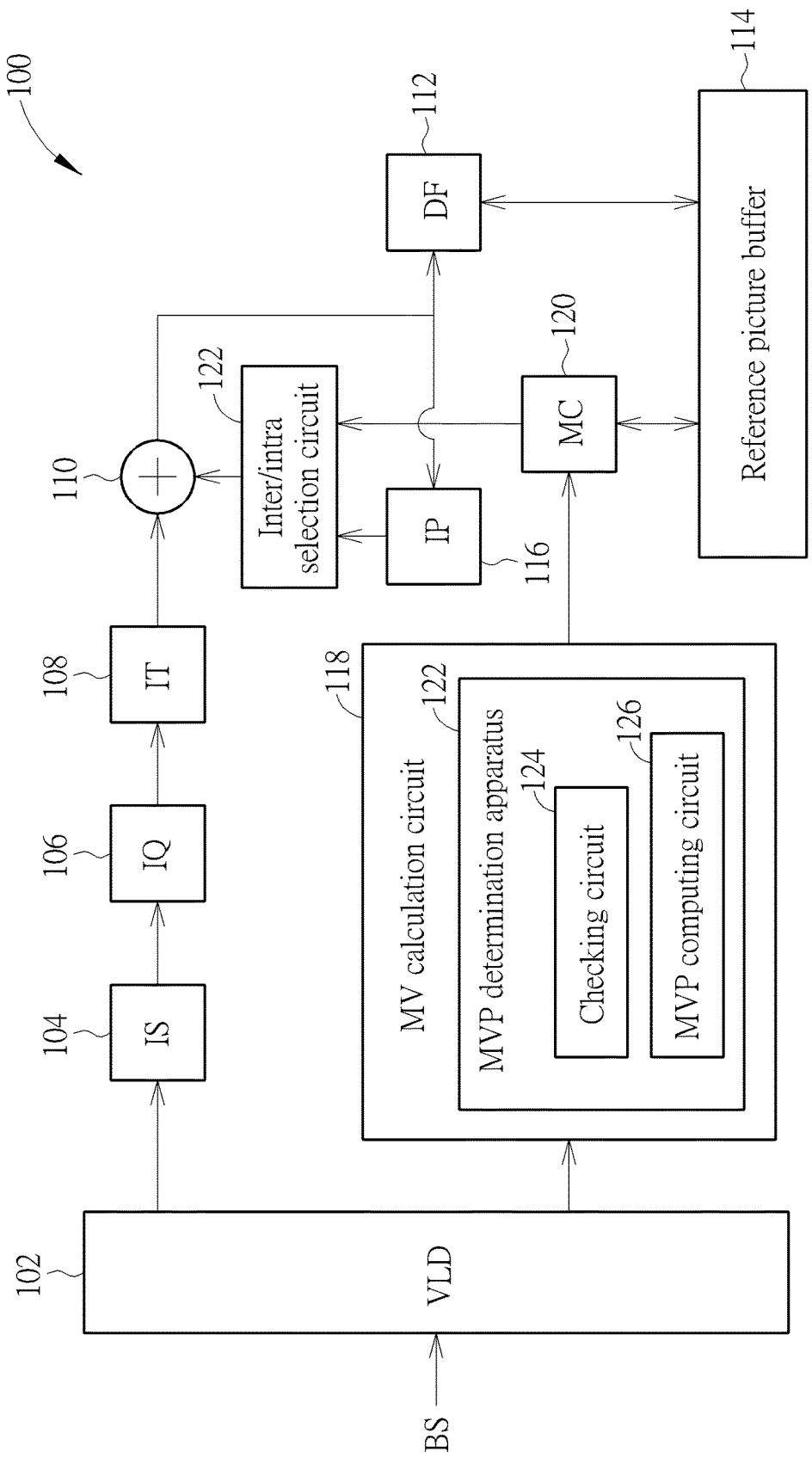
FIG. 1 is a diagram of a video decoder according to an embodiment of the present invention.

FIG. 1 is a diagram of a video decoder according to an embodiment of the present invention. The video decoder 100 may be part of an electronic device, such as a personal computer (e.g., a laptop computer or a desktop computer), a mobile phone, a tablet, or a wearable device. The video decoder 100 is arranged for decoding a bitstream BS to generate a video sequence composed of a plurality of consecutive decoded pictures (i.e., reconstructed pictures). At least a portion (i.e., part or all) of the video decoder 100 may be implemented in an integrated circuit (IC). To put it simply, any electronic device or electronic system using the proposed video decoder 100 falls within the scope of the present invention.

As shown in FIG. 1, the video decoder 100 includes an entropy decoder (e.g., a variable-length decoder (VLD) 102), an inverse scan circuit (denoted as "IS") 104, an inverse quantization circuit (denoted as "IQ") 106, an inverse transform circuit (denoted as "IT") 108, a reconstruct circuit 110, at least one in-loop filter (e.g., a deblocking filter (DF) 112), a reference picture buffer 114, an intra prediction circuit (denoted as "IP") 116, a motion vector (MV) calculation circuit 118, a motion compensation circuit (denoted as "MC") 120, and an intra/inter selection circuit 122. The reference picture buffer 114 may be an external storage device such as an off-chip dynamic random access memory (DRAM). In this embodiment, the MV calculation circuit 118 includes a motion vector predictor (MVP) determination apparatus 122 with an improved speed for the MVP determination. The MVP determination apparatus 122 may include a checking circuit 124 and an MVP computing circuit 126. Further details of the proposed MVP determination apparatus 122 will be described later.

By way of example, but not limitation, the video decoder 100 may be used to decode the incoming bitstream BS generated using a VP9 coding standard that is an open and royalty-free video coding standard being developed by Google®. However, this is for illustrative purposes only, and is not meant to be a limitation of the present invention. Any video decoder using the proposed video decoder structure, particularly the proposed MVP determination apparatus 122, falls within the scope of the present invention.

The VLD 102 is arranged to apply entropy decoding to the incoming bitstream BS for generating intra/inter mode information (e.g., motion vector differences of inter prediction)

and residues. The residues are transmitted to the reconstruct circuit 110 through being inverse scanned (which is performed at the inverse scan circuit 104), inverse quantized (which is performed at the inverse quantization circuit 106), and inverse transformed (which is performed at the inverse transform circuit 108).

The inter/intra selection circuit 122 is used to decide a prediction mode of a current block to be decoded. For example, when the prediction mode of the current block is decided to be inter prediction, predicted pixels/samples generated from the motion compensation circuit 120 are output to the following decoding stage, such as a reconstruct circuit 110. For another example, when the prediction mode of the current block is decided to be intra prediction, predicted pixels/samples generated from the intra prediction circuit 116 are output to the following decoding stage, such as the reconstruct circuit 110.

The reconstruct circuit 110 is arranged to combine a residue output of the inverse transform circuit 108 and a predicted pixel output of one of intra prediction circuit 116 and motion compensation circuit 120 to thereby generate reconstructed pixels/samples of each block of a picture (i.e., a reconstructed/decoded picture). The de-blocking filter 112 is arranged to apply de-blocking filtering to the reconstructed picture generated from the reconstruct circuit 110, and then generate a de-blocked picture as a reference picture. The de-blocked reference picture is stored into the reference picture buffer 114, and may be referenced by the motion compensation circuit 118 to generate predicted pixels/samples.

Figure 2:
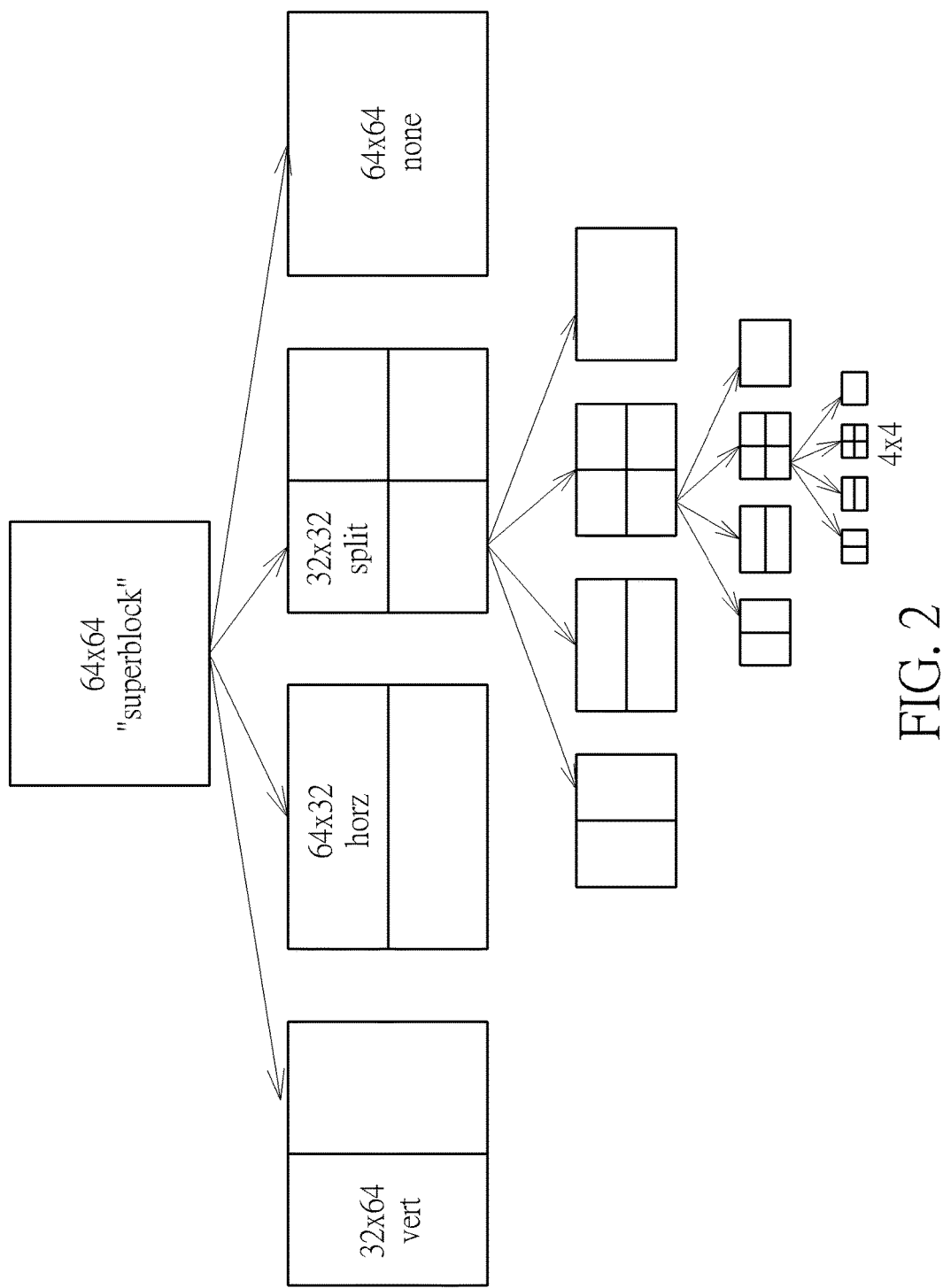
FIG. 2 is a diagram illustrating recursive partitioning of a superblock into various sizes of mode information units.

VP9 divides one picture into 64×64-sized blocks that are called superblocks. Superblocks of the picture are processed in raster order: left to right, top to bottom. In addition, VP9 supports quad-tree based encoding. Hence, recursive partitioning may be employed to split each superblock into one or more partitions (e.g., smaller-sized blocks) for further processing. FIG. 2 is a diagram illustrating recursive partitioning of one superblock into various sizes of mode information (MI) units. For example, one superblock with the block size of 64×64 may be split into one or more coding units (or called MI units), where the partitions supported by VP9 coding standard may include square partitions, such as a 64×64-sized block, a 32×32-sized block, a 16×16-sized block, a 8×8-sized block, a 4×4-sized block, and may further include non-square partitions, such as a 64×32-sized block, a 32×64-sized block, 32×16-sized block, a 16×32-sized block, . . . , a 4×8-sized block, a 8×4-sized block. Hence, the coding unit (MI unit) sizes may include 64×64, 32×32, 16×16, 8×8, 64×32, 32×64, 32×16, 16×32, . . . , 8×8, 4×8, 8×4, 4×4. Although "4×4" is the smallest partition, lots of information is stored at "8×8" granularity only. This causes blocks smaller than "8×8" to be handled as sort of a special case.

For any MI unit size, VP9 will perform a best MVP determination flow to find one best MVP. In a case where an MI unit size is not smaller than 8×8, the best MVP is directly referenced to determine an MV of a block with the MI unit size. In another case where an MI unit size is smaller than 8×8, an additional sub-block MVP determination flow will be performed to find one sub-block MVP for each sub-block within one 8×8 block, where the best MVP and the sub-block MVP of a sub-block with the MI unit size may be involved in determining an MV of the sub-block. For example, when the MI unit size is 4×4, one 8×8 block is composed of four square sub-blocks (i.e., 4×4 sub-blocks). Hence, 4 iterations of the sub-block MVP determination flow are required by a conventional design to determine sub-block MVPs of the four 4×4 sub-blocks, respectively. For another example, when the MI unit size is 4×8, one 8×8 block is composed of two non-square sub-blocks (i.e., 4×8 sub-blocks). Hence, 2 iterations of the sub-block MVP determination flow are required by the conventional design to determine sub-block MVPs of the two 4×8 sub-blocks, respectively. For yet another example, when the MI unit size is 8×4, one 8×8 block is composed of two non-square sub-blocks (i.e., 8×4 sub-blocks). Hence, 2 iterations of the sub-block MVP determination flow are required by the conventional design to determine sub-block MVPs of the two 8×4 sub-blocks, respectively. With regard to the conventional design, the numbers of iterations for finding MVPs in different MI unit sizes are listed in the following table.

TABLE 1

| MI Unit Size | Best MVP | Sub-block MVP | Total |
|---|---|---|---|
| MI ≥ 8 × 8 | 1 | 0 | 1 |
| MI = 4 × 8 | 1 | 2 | 3 |
| MI = 8 × 4 | 1 | 2 | 3 |
| MI = 4 × 4 | 1 | 4 | 5 |

For MI unit size <8×8, VP9 requires extra time to find the sub-block MVPs compared to the condition of MI ≥8×8. This might induce considerable timing overhead if an inter-frame is composed of a large number of MI units smaller than 8×8. The present invention therefore proposes using the MVP determination apparatus 122 to efficiently reduce the number of iterations of the sub-block MVP determination flow.

In a first exemplary implementation, the MVP determination apparatus 122 may be configured to reduce the number of iterations of the sub-block MVP determination flow according to a first lemma. In accordance with the first lemma, given two MI units $mi_a$, $mi_b$ with the same size and the same reference frame, where the MI units $mi_a$, $mi_b$ have n neighbor motion vector data $nb_{ai}$, $nb_{bi}$ and m MVPs $mvp_{aj}$, $mvp_{bj}$, respectively, $mvp_{aj}$=$mvp_{bj}$ if $nb_{ai}$=$nb_{bi}$. Note than 0≤i<n, 0≤j<m, where n and m depend on the specification in each decoding format. For example, n=8 and m=2 for VP9. FIG. 3 is a diagram illustrating an example of two VP9 MI units $mi_a$ and $mi_b$ with the same size and the same reference frame. The MI unit $mi_a$ has 8 neighbor motion vector data $nb_{a0}$-$nb_{a7}$, and the MI unit $mi_b$ also has 8 neighbor motion vector data $nb_{b0}$-$nb_{b7}$. The MVP result depends on the input MI unit and the neighbors of the MI unit. If the sizes of the MI units $mi_a$, $mi_b$ are identical, the reference frames of the MI units $mi_a$, $mi_b$ are identical (i.e., the neighbor motion vector data $nb_{a0}$-$nb_{a7}$ and $nb_{b0}$-$nb_{b7}$ are possessed by blocks in the same reference frame), and the neighbor motion vector data of the MI units $mi_a$, $mi_b$ are identical (i.e., $nb_{ai}$=$nb_{bi}$), then the MVP of the MI unit $mi_a$ must be the same as that of the MI unit $mi_b$.

In accordance with the first lemma, the MVP determination apparatus 122 may speed up the iterations of the sub-block determination flow by early termination or may directly skip one or more iterations of the sub-block determination flow, depending upon the actual design considerations. In the first exemplary implementation employing the first lemma, the checking circuit 124 is arranged to check if motion vector data of at least one first neighbor unit (e.g., 4×4 unit) adjacent to a block (e.g., 8×8 MI unit) and motion vector data of at least one second neighbor unit (e.g., 4×4 unit) adjacent to the block (e.g., 8×8 MI unit) are identical to each other; and the motion vector predictor computing circuit 126 is arranged to assign a motion vector predictor determined for a first sub-block within the block to a second sub-block within the block when the checking circuit 124 determines that the motion vector data of the at least one first neighbor unit is identical to the motion vector data of the at least one second neighbor unit, where the motion vector data of the at least one first neighbor unit is involved in determining the motion vector predictor of the first sub-block, and the motion vector data of the at least one second neighbor unit is not involved in determining the motion vector predictor of the first sub-block.

Figure 4:
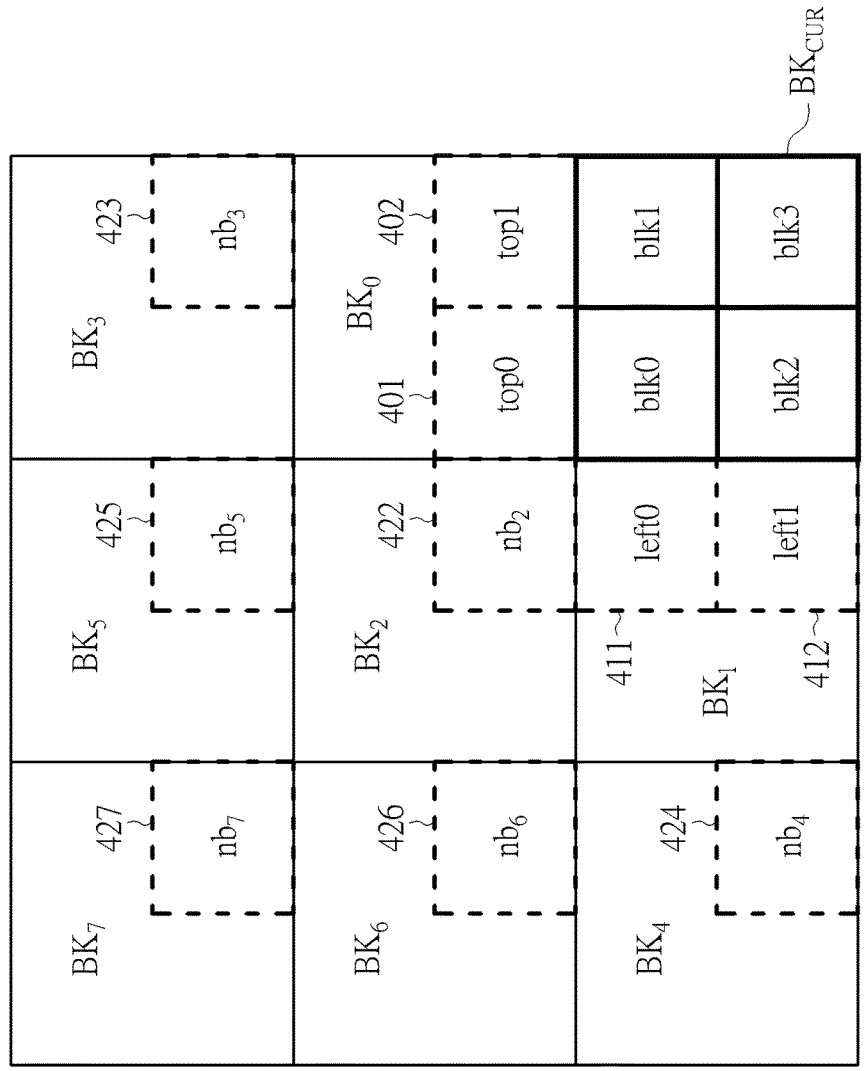
FIG. 4 is a diagram illustrating an 8×8 block sub-divided into four 4×4 sub-blocks according to an embodiment of the present invention.

FIG. 4 is a diagram illustrating an 8×8 block sub-divided into four 4×4 sub-blocks according to an embodiment of the present invention. Since each of the sub-blocks blk0-blk3 within the same 8×8 block $BK_{CUR}$ has a size smaller than 8×8, a sub-block MVP determination flow will be performed. As shown in FIG. 4, there are neighbor 8×8 blocks $BK_0$-$BK_7$ (which are reconstructed blocks). Since the minimum size of the sub-block is 4×4, the neighbor motion vector data is stored in a 4×4 neighbor unit. With regard to the 4×4 sub-block blk0, the associated sub-block MVP may be determined on the basis of the motion vector data top0 of the neighbor unit 401 in the neighbor block $BK_0$, the motion vector data left0 of the neighbor unit 411 in the neighbor block $BK_1$, the motion vector data $nb_2$ of the neighbor unit 422 in the neighbor block $BK_2$, the motion vector data $nb_3$ of the neighbor unit 423 in the neighbor block $BK_3$, the motion vector data $nb_4$ of the neighbor unit 424 in the neighbor block $BK_4$, the motion vector data $nb_5$ of the neighbor unit 425 in the neighbor block $BK_5$, the motion vector data $nb_6$ of the neighbor unit 426 in the neighbor block $BK_6$, and the motion vector data $nb_7$ of the neighbor unit 427 in the neighbor block $BK_7$. It should be noted that the neighbor units 401 and 411 are adjacent to the 8×8 block $BK_{CUR}$, where among the neighbor units of the 8×8 block $BK_{CUR}$, the neighbor unit 401 is closest to the sub-block blk0 in the vertical direction, and the neighbor unit 411 is closest to the sub-block blk0 in the horizontal direction.

With regard to the 4×4 sub-block blk1, the associated sub-block MVP may be determined on the basis of the motion vector data top1 of the neighbor unit 402 in the neighbor block $BK_0$, the motion vector data left0 of the neighbor unit 411 in the neighbor block $BK_1$, the motion vector data $nb_2$ of the neighbor unit 422 in the neighbor block $BK_2$, the motion vector data $nb_3$ of the neighbor unit 423 in the neighbor block $BK_3$, the motion vector data $nb_4$ of the neighbor unit 424 in the neighbor block $BK_4$, the motion vector data $nb_5$ of the neighbor unit 425 in the neighbor block $BK_5$, the motion vector data $nb_6$ of the neighbor unit 426 in the neighbor block $BK_6$, and the motion vector data $nb_7$ of the neighbor unit 427 in the neighbor block $BK_7$. It should be noted that the neighbor units 402 and 411 are adjacent to the 8×8 block $BK_{CUR}$, where among the neighbor units of the 8×8 block $BK_{CUR}$, the neighbor unit 402 is closest to the sub-block blk1 in the vertical direction, and the neighbor unit 411 is closest to the sub-block blk1 in the horizontal direction.

With regard to the 4×4 sub-block blk2, the associated sub-block MVP may be determined on the basis of the motion vector data top0 of the neighbor unit 401 in the neighbor block $BK_0$, the motion vector data left1 of the neighbor unit 412 in the neighbor block $BK_1$, the motion vector data $nb_2$ of the neighbor unit 422 in the neighbor block $BK_2$, the motion vector data $nb_3$ of the neighbor unit 423 in the neighbor block $BK_3$, the motion vector data $nb_4$ of the neighbor unit 424 in the neighbor block $BK_4$, the motion vector data $nb_5$ of the neighbor unit 425 in the neighbor block $BK_5$, the motion vector data $nb_6$ of the neighbor unit 426 in the neighbor block $BK_6$, and the motion vector data $nb_7$ of the neighbor unit 427 in the neighbor block $BK_7$. It should be noted that the neighbor units 401 and 412 are adjacent to the 8×8 block $BK_{CUR}$, where among the neighbor units of the 8×8 block $BK_{CUR}$, the neighbor unit 401 is closest to the sub-block blk2 in the vertical direction, and the neighbor unit 412 is closest to the sub-block blk2 in the horizontal direction.

With regard to the 4×4 sub-block blk3, the associated sub-block MVP may be determined on the basis of the motion vector data top1 of the neighbor unit 402 in the neighbor block $BK_0$, the motion vector data left1 of the neighbor unit 412 in the neighbor block $BK_1$, the motion vector data $nb_2$ of the neighbor unit 422 in the neighbor block $BK_2$, the motion vector data $nb_3$ of the neighbor unit 423 in the neighbor block $BK_3$, the motion vector data $nb_4$ of the neighbor unit 424 in the neighbor block $BK_4$, the motion vector data $nb_5$ of the neighbor unit 425 in the neighbor block $BK_5$, the motion vector data $nb_6$ of the neighbor unit 426 in the neighbor block $BK_6$, and the motion vector data $nb_7$ of the neighbor unit 427 in the neighbor block $BK_7$. It should be noted that the neighbor units 402 and 412 are adjacent to the 8×8 block $BK_{CUR}$, where among the neighbor units of the 8×8 block $BK_{CUR}$, the neighbor unit 402 is closest to the sub-block blk2 in the vertical direction, and the neighbor unit 412 is closest to the sub-block blk2 in the horizontal direction.

As can be seen from FIG. 4, the sub-block MVP determination for each of the sub-blocks blk0-blk3 refers to the same motion vector data $nb_2$-$nb_7$. Hence, the checking circuit 124 may simply check the motion vector data top0 of the neighbor unit 401, the motion vector data top1 of the neighbor unit 402, the motion vector data left0 of the neighbor unit 411, and the motion vector data left1 of the neighbor unit 412, where the neighbor units 401 and 402 are on the same side (i.e., top side) of the block $BK_{CUR}$, and the neighbor units 411 and 412 are on the same side (i.e., left side) of the block $BK_{CUR}$. The MVP computing circuit 126 may refer to a checking result generated from the checking circuit 124 to determine whether the condition of the first lemma is satisfied for certain sub-blocks within the same block $BK_{CUR}$. If the condition of the first lemma is satisfied for certain sub-blocks within the same block $BK_{CUR}$, one iteration of the sub-block MVP determination flow may be actually performed by the MVP computing circuit 126 to compute a sub-block MVP for one sub-block, and then the sub-block MVP determine for the sub-block may be directly assigned to other sub-block(s).

Figure 5:
FIG. 5 is a diagram illustrating a first case where the condition of the first lemma is satisfied for two 4×4 sub-blocks within the same 8×8 block according to an embodiment of the present invention.

FIG. 5 is a diagram illustrating a first case where the condition of the first lemma is satisfied for two 4×4 sub-blocks within the same 8×8 block according to an embodiment of the present invention. As mentioned above, the motion vector data top0 and the motion vector data left0 may be involved in determining the sub-block MVP of the sub-block blk0, and the motion vector data top1 and the same motion vector data left0 may be involved in determining the sub-block MVP of the sub-block blk1. It should be noted that the motion vector data top1 may not be involved in determining the sub-block MVP of the sub-block blk0, and the motion vector data top0 may not be involved in determining the sub-block MVP of the sub-block blk1. However, when the checking circuit 124 determines that the motion vector data top0 and the motion vector data top1 are identical to each other, the condition of the first lemma for the sub-blocks blk0 and blk1 is satisfied, which means that the sub-block MVP of the sub-block blk1 should be the same as the sub-block MVP of the sub-block blk0.

In one exemplary design, the MVP computing circuit 126 may perform one iteration of the sub-block MVP determination flow to compute the sub-block MVP of the sub-block blk0, and then assign the sub-block MVP determined for the sub-block blk0 to the sub-block blk1. Hence, another iteration of the sub-block MVP determination flow to compute the sub-block MVP of the sub-block blk1 can be skipped or early terminated to reduce the computation load as well as the computation time.

In another exemplary design, the MVP computing circuit 126 may perform one iteration of the sub-block MVP determination flow to compute the sub-block MVP of the sub-block blk1, and then assign the sub-block MVP determined for the sub-block blk1 to the sub-block blk0. Hence, another iteration of the sub-block MVP determination flow to compute the motion vector predictor of the sub-block blk0 can be skipped or early terminated to reduce the computation load as well as the computation time.

Figure 6:
FIG. 6 is a diagram illustrating a second case where the condition of the first lemma is satisfied for two 4×4 sub-blocks within the same 8×8 block according to an embodiment of the present invention.

FIG. 6 is a diagram illustrating a second case where the condition of the first lemma is satisfied for two 4×4 sub-blocks within the same 8×8 block according to an embodiment of the present invention. As mentioned above, the motion vector data top0 and the motion vector data left1 may be involved in determining the sub-block MVP of the sub-block blk2, and the motion vector data top1 and the same motion vector data left1 may be involved in determining the sub-block MVP of the sub-block blk3. It should be noted that the motion vector data top1 may not be involved in determining the sub-block MVP of the sub-block blk2, and the motion vector data top1 may not be involved in determining the sub-block MVP of the sub-block blk2. However, when the checking circuit 124 determines that the motion vector data top0 and the motion vector data top1 are identical to each other, the condition of the first lemma for the sub-blocks blk2 and blk3 is satisfied, which means that the sub-block MVP of the sub-block blk3 should be the same as the sub-block MVP of the sub-block blk2.

In one exemplary design, the MVP computing circuit 126 may perform one iteration of the sub-block MVP determination flow to compute the sub-block MVP of the sub-block blk2, and then assign the sub-block MVP determined for the sub-block blk2 to the sub-block blk3. Hence, another iteration of the sub-block MVP determination flow to compute the sub-block MVP of the sub-block blk3 can be skipped or early terminated to reduce the computation load as well as the computation time.

In another exemplary design, the MVP computing circuit 126 may perform one iteration of the sub-block MVP determination flow to compute the sub-block MVP of the sub-block blk3, and then assign the sub-block MVP determined for the sub-block blk3 to the sub-block blk2. Hence, another iteration of the sub-block MVP determination flow to compute the sub-block MVP of the sub-block blk2 can be skipped or early terminated to reduce the computation load as well as the computation time.

Figure 7:
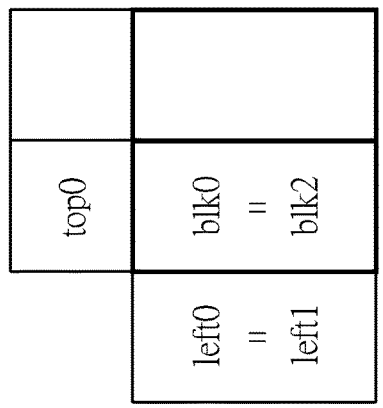
FIG. 7 is a diagram illustrating a third case where the condition of the first lemma is satisfied for two 4×4 sub-blocks within the same 8×8 block according to an embodiment of the present invention.
Figure 7:
Figure 7:
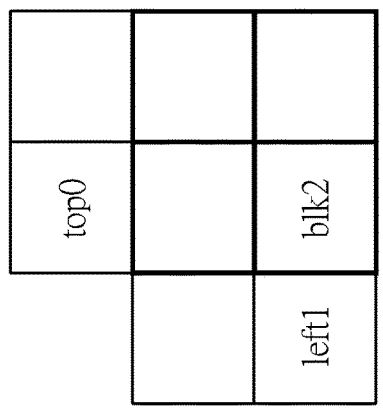
Figure 7:
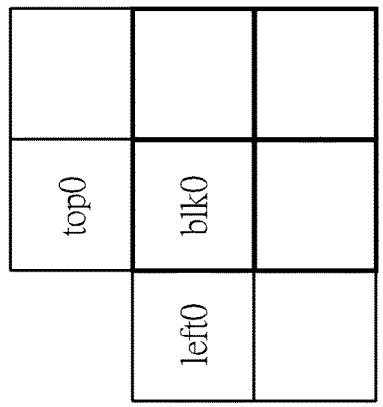

FIG. 7 is a diagram illustrating a third case where the condition of the first lemma is satisfied for two 4×4 sub-blocks within the same 8×8 block according to an embodiment of the present invention. As mentioned above, the motion vector data top0 and the motion vector data left0 may be involved in determining the sub-block MVP of the sub-block blk0, and the motion vector data left1 and the same motion vector data top0 may be involved in determining the sub-block MVP of the sub-block blk2. It should be noted that the motion vector data left1 may not be involved in determining the sub-block MVP of the sub-block blk0, and the motion vector data left0 may not be involved in determining the sub-block MVP of the sub-block blk2. However, when the checking circuit 124 determines that the motion vector data left0 and the motion vector data left1 are identical to each other, the condition of the first lemma for the sub-blocks blk0 and blk2 is satisfied, which means that the sub-block MVP of the sub-block blk2 should be the same as the sub-block MVP of the sub-block blk0.

In one exemplary design, the MVP computing circuit 126 may perform one iteration of the sub-block MVP determination flow to compute the sub-block MVP of the sub-block blk0, and then assign the sub-block MVP determined for the sub-block blk0 to the sub-block blk2. Hence, another iteration of the sub-block MVP determination flow to compute the sub-block MVP of the sub-block blk2 can be skipped or early terminated to reduce the computation load as well as the computation time.

In another exemplary design, the MVP computing circuit 126 may perform one iteration of the sub-block MVP determination flow to compute the sub-block MVP of the sub-block blk2, and then assign the sub-block MVP determined for the sub-block blk2 to the sub-block blk0. Hence, another iteration of the sub-block MVP determination flow to compute the sub-block MVP of the sub-block blk0 can be skipped or early terminated to reduce the computation load as well as the computation time.

Figure 8:
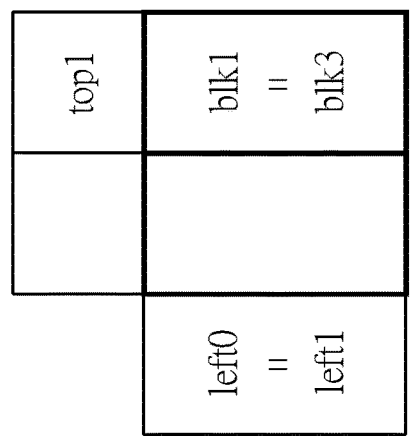
FIG. 8 is a diagram illustrating a fourth case where the condition of the first lemma is satisfied for two 4×4 sub-blocks within the same 8×8 block according to an embodiment of the present invention.
Figure 8:
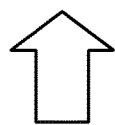
Figure 8:
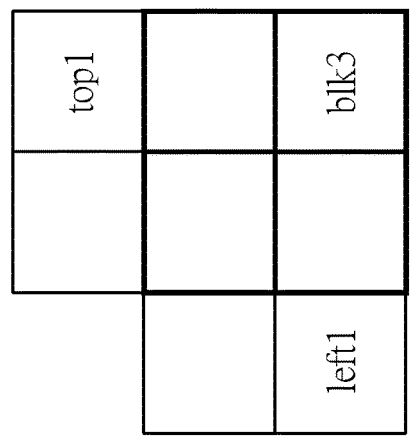
Figure 8:
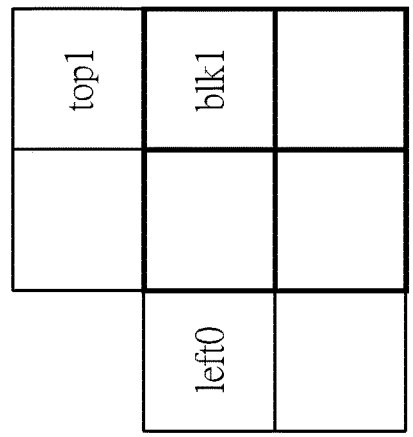

FIG. 8 is a diagram illustrating a fourth case where the condition of the first lemma is satisfied for two 4×4 sub-blocks within the same 8×8 block according to an embodiment of the present invention. As mentioned above, the motion vector data top1 and the motion vector data left0 may be involved in determining the sub-block MVP of the sub-block blk1, and the motion vector data left1 and the same motion vector data top1 may be involved in determining the sub-block MVP of the sub-block blk3. It should be noted that the motion vector data left1 may not be involved in determining the sub-block MVP of the sub-block blk1, and the motion vector data left0 may not be involved in determining the sub-block MVP of the sub-block blk3. However, when the checking circuit 124 determines that the motion vector data left0 and the motion vector data left1 are identical to each other, the condition of the first lemma for the sub-blocks blk1 and blk3 is satisfied, which means that the sub-block MVP of the sub-block blk3 should be the same as the sub-block MVP of the sub-block blk1.

In one exemplary design, the MVP computing circuit 126 may perform one iteration of the sub-block MVP determination flow to compute the sub-block MVP of the sub-block blk1, and then assign the sub-block MVP determined for the sub-block blk1 to the sub-block blk3. Hence, another iteration of the sub-block MVP determination flow to compute the sub-block MVP of the sub-block blk3 can be skipped or early terminated to reduce the computation load as well as the computation time.

In another exemplary design, the MVP computing circuit 126 may perform one iteration of the sub-block MVP determination flow to compute the sub-block MVP of the sub-block blk3, and then assign the sub-block MVP determined for the sub-block blk3 to the sub-block blk1. Hence, another iteration of the sub-block MVP determination flow to compute the sub-block MVP of the sub-block blk1 can be skipped or early terminated to reduce the computation load as well as the computation time.

Figure 9:
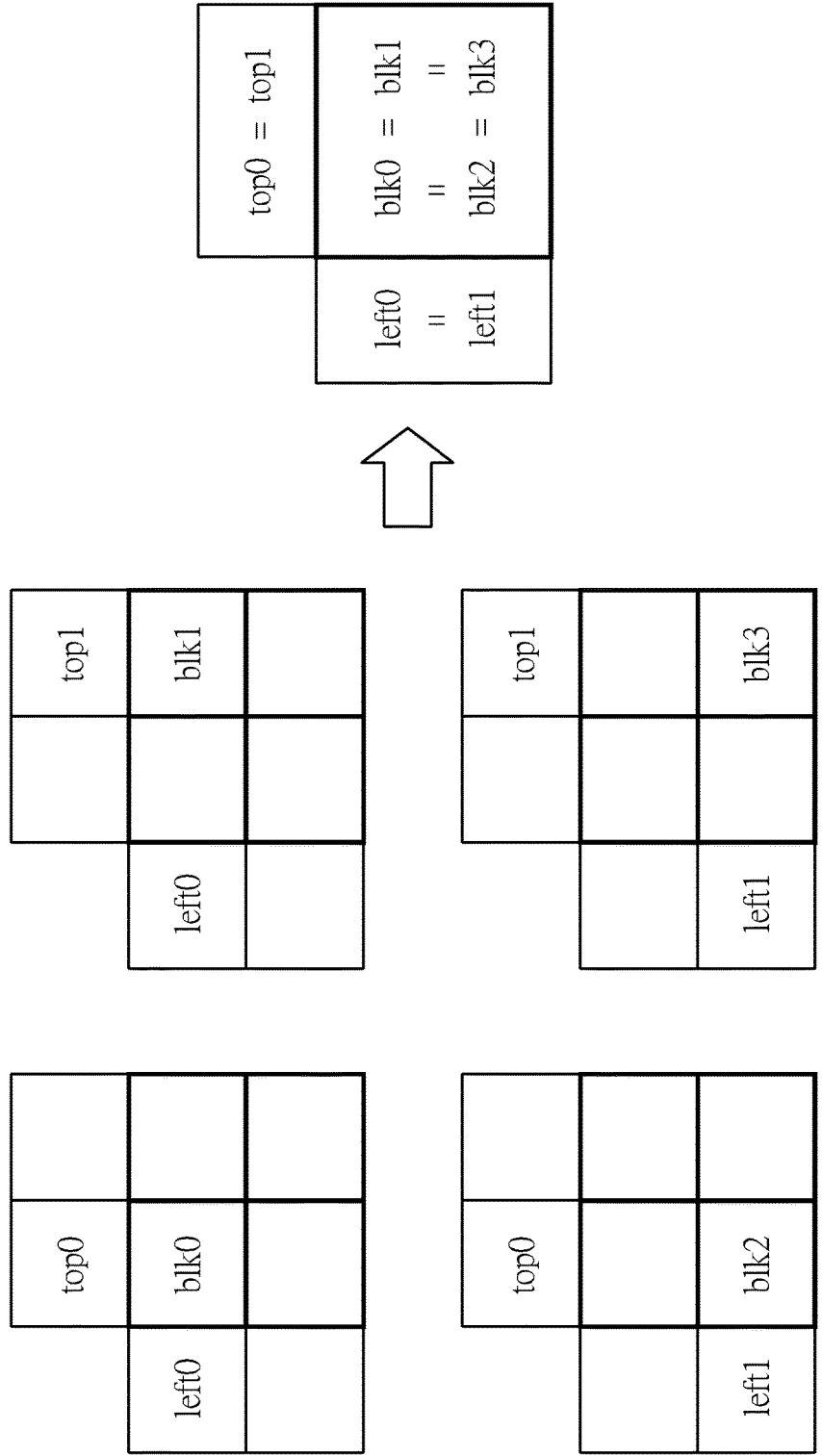
FIG. 9 is a diagram illustrating a fifth case where the condition of the first lemma is satisfied for all 4×4 sub-blocks within the same 8×8 block according to an embodiment of the present invention.

FIG. 9 is a diagram illustrating a fifth case where the condition of the first lemma is satisfied for all 4×4 sub-blocks within the same 8×8 block according to an embodiment of the present invention. When the checking circuit 124 determines that the motion vector data top0 and the motion vector data top1 are identical to each other and the motion vector data left0 and the motion vector data left1 are identical to each other, the condition of the first lemma for all sub-blocks blk0-blk3 is satisfied, which means that the sub-block MVPs of all sub-blocks blk0-blk3 should be the same. In one exemplary design, the MVP computing circuit 126 may perform one iteration of the sub-block MVP determination flow to compute the sub-block MVP of a selected sub-block (e.g., blk0) among the sub-blocks blk0-blk3, and then assign the sub-block MVP determined for the selected sub-block (e.g., blk0) to each of the rest of the sub-blocks blk0-blk3. Hence, other iterations of the sub-block MVP determination flow to compute the sub-block MVPs of the rest of the sub-block blk0-blk3 can be skipped or early terminated to reduce the computation load as well as the computation time.

When the MI unit size is 8×4, one 8×8 block is composed of two 8×4 sub-blocks. Similarly, the checking circuit 124 may check the motion vector data of neighbor units (which are 4×4 units), and the MVP computing circuit 126 may refer to a checking result generated from the checking circuit 124 to determine whether the condition of the first lemma is satisfied for two 8×4 sub-blocks within the same 8×8 block. If the condition of the first lemma is satisfied for two 8×4 sub-blocks within the same 8×8 block, one iteration of the sub-block MVP determination flow is actually performed by the MVP computing circuit 126 to compute a sub-block MVP for one 8×4 sub-block, and the sub-block MVP determined for one 8×4 sub-block is assigned to the other 8×4 sub-block.

Figure 10:
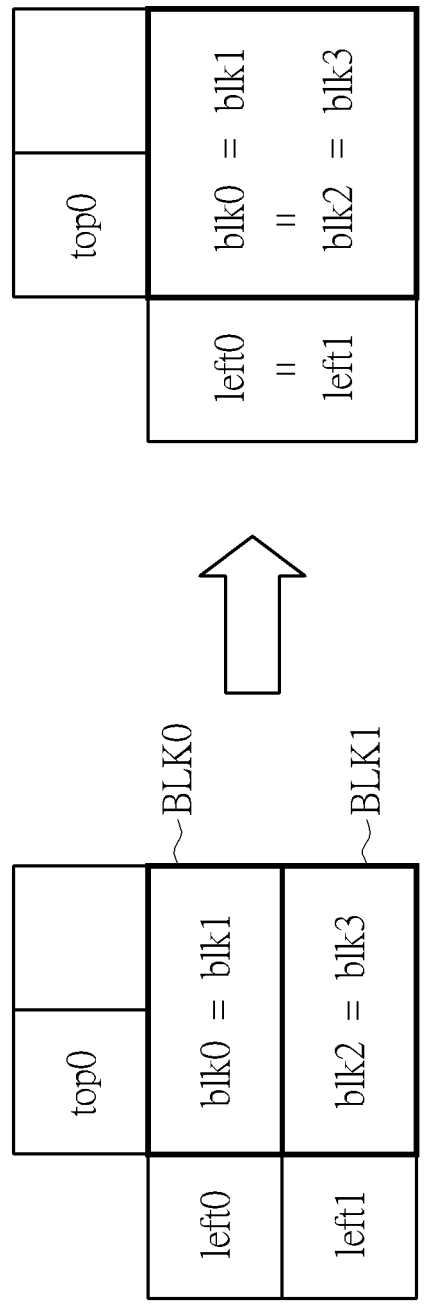
FIG. 10 is a diagram illustrating a case where the condition of the first lemma is satisfied for two 8×4 sub-blocks within the same 8×8 block according to an embodiment of the present invention.

FIG. 10 is a diagram illustrating a case where the condition of the first lemma is satisfied for two 8×4 sub-blocks within the same 8×8 block according to an embodiment of the present invention. Each of the 8×4 sub-blocks may be regarded as having two 4×4 sub-blocks. For example, the 8×4 sub-block BLK0 is composed of two 4×4 sub-blocks blk0 and blk1, and the 8×4 sub-block BLK1 is composed of two 4×4 sub-blocks blk2 and blk3. In addition, the sub-block MVP of the 8×4 sub-block BLK0 may be set by the sub-block MVP determined for the 4×4 sub-block blk0, and the sub-block MVP of the 8×4 sub-block BLK1 may be set by the sub-block MVP determined for the 4×4 sub-block blk2. Since the 4×4 sub-blocks blk0 and blk1 are within the same 8×4 sub-block BLK0, the sub-block MVP determined for the 4×4 sub-block blk0 (i.e., the sub-block MVP of the 8×4 sub-block BLK0) may also be used by the 4×4 sub-block blk1. Similarly, since the 4×4 sub-blocks blk2 and blk3 are within the same 8×4 sub-block BLK1, the sub-block MVP determined for the 4×4 sub-block blk2 (i.e., the sub-block MVP of the 8×4 sub-block BLK1) may also be used by the 4×4 sub-block blk3.

As mentioned above, the motion vector data top0 and the motion vector data left0 may be involved in determining the sub-block MV of the sub-block blk0, and the motion vector data left1 and the same motion vector data top0 may be involved in determining the sub-block MVP of the sub-block blk2. Hence, the motion vector data top0 and the motion vector data left0 may be involved in determining the sub-block MVP of the 8×4 sub-block BLK0, and the motion vector data left1 and the same motion vector data top0 may be involved in determining the sub-block MVP of the 8×4 sub-block BLK1. When the checking circuit 124 determines that the motion vector data left0 and the motion vector data left1 are identical to each other, the condition of the first lemma for the 8×4 sub-blocks BLK0 and BLK1 is satisfied, which means that the sub-block MVP of the 8×4 sub-block BLK0 should be the same as the sub-block MVP of the 8×4 sub-block BLK1.

In one exemplary design, the MVP computing circuit 126 may perform one iteration of the sub-block MVP determination flow to compute the sub-block MVP of the 8×4 sub-block BLK0, and then assign the sub-block MVP determined for the 8×4 sub-block BLK0 to the 8×4 sub-block BLK1. Hence, another iteration of the sub-block MVP determination flow to compute the sub-block MVP of the 8×4 sub-block BLK1 can be skipped or early terminated to reduce the computation load as well as the computation time.

In another exemplary design, the MVP computing circuit 126 may perform one iteration of the sub-block MVP determination flow to compute the sub-block MVP of the 8×4 sub-block BLK1, and then assign the sub-block MVP determined for the 8×4 sub-block BLK1 to the 8×4 sub-block BLK0. Hence, another iteration of the sub-block MVP determination flow to compute the sub-block MVP of the 8×4 sub-block BLK0 can be skipped or early terminated to reduce the computation load as well as the computation time.

Figure 11:
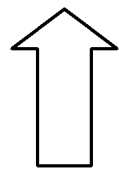
FIG. 11 is a diagram illustrating a case where the condition of the first lemma is satisfied for two 4×8 sub-blocks within the same 8×8 block according to an embodiment of the present invention.

FIG. 11 is a diagram illustrating a case where the condition of the first lemma is satisfied for two 4×8 sub-blocks within the same 8×8 block according to an embodiment of the present invention. Each of the 4×8 sub-blocks may be regarded as having two 4×4 sub-blocks. For example, the 4×8 sub-block BLK0' is composed of two 4×4 sub-blocks blk0 and blk2, and the 4×8 sub-block BLK1' is composed of two 4×4 sub-blocks blk1 and blk3. In addition, the sub-block MVP of the 4×8 sub-block BLK0' may be set by the sub-block MVP determined for the 4×4 sub-block blk0, and the sub-block MVP of the 4×8 sub-block BLK1' may be set by the sub-block MVP determined for the 4×4 sub-block blk1. Since the 4×4 sub-blocks blk0 and blk2 are within the same 4×8 sub-block BLK0', the sub-block MVP determined for the 4×4 sub-block blk0 (i.e., the sub-block MVP of the 8×4 sub-block BLK0') may also be used by the 4×4 sub-block blk2. Similarly, since the 4×4 sub-blocks blk1 and blk3 are within the same 4×8 sub-block BLK1', the sub-block MVP determined for the 4×4 sub-block blk1 (i.e., the sub-block MVP of the 4×8 sub-block BLK1') may also be used by the 4×4 sub-block blk3.

As mentioned above, the motion vector data top0 and the motion vector data left0 may be involved in determining the sub-block MVP of the sub-block blk0, and the motion vector data top1 and the same motion vector data left0 may be involved in determining the sub-block MVP of the sub-block blk1. In other words, the motion vector data top0 and the motion vector data left0 may be involved in determining the sub-block MVP of the 4×8 sub-block BLK0', and the motion vector data top1 and the same motion vector data left0 may be involved in determining the sub-block MVP of the 4×8 sub-block BLK1'. When the checking circuit 124 determines that the motion vector data top0 and the motion vector data top1 are identical to each other, the condition of the first lemma for the 4×8 sub-blocks BLK0' and BLK1' is satisfied, which means that the sub-block MVP of the 4×8 sub-block BLK0' should be the same as the sub-block MVP of the 4×8 sub-block BLK1'.

In one exemplary design, the MVP computing circuit 126 may perform one iteration of the sub-block MVP determination flow to compute the sub-block MVP of the 4×8 sub-block BLK0', and then assign the sub-block MVP determined for the 4×8 sub-block BLK0' to the 4×8 sub-block BLK1'. Hence, another iteration of the sub-block MVP determination flow to compute the sub-block MVP of the 4×8 sub-block BLK1' can be skipped or early terminated to reduce the computation load as well as the computation time.

In another exemplary design, the MVP computing circuit 126 may perform one iteration of the sub-block MVP determination flow to compute the sub-block MVP of the 4×8 sub-block BLK1', and then assign the sub-block MVP determined for the 4×8 sub-block BLK1' to the 4×8 sub-block BLK0'. Hence, another iteration of the sub-block MVP determination flow to compute the sub-block MVP of the 4×8 sub-block BLK0' can be skipped or early terminated to reduce the computation load as well as the computation time.

With regard to the aforementioned first exemplary implementation that employs the first lemma to efficiently improve the speed of the MVP determination, the numbers of iterations of sub-block MVP determination flow under different MI unit sizes and different cases are listed in the following table.

TABLE 2

| MI Unit Size | Conventional design | Proposed Design (Case 1: top0 = top1 & left0 ≠ left1) | Proposed Design (Case 2: left0 = left1 & top0 ≠ top1) | Proposed Design (Case 3: top0 = top1 & left0 = left1) |
|---|---|---|---|---|
| MI = 4 × 8 | 2 | 1 | 2 | 1 |
| MI = 8 × 4 | 2 | 2 | 1 | 1 |
| MI = 4 × 4 | 4 | 2 | 2 | 1 |

In a second exemplary implementation, the MVP determination apparatus 122 may be configured to reduce the number of iterations of the sub-block MVP determination flow according to a second lemma. In accordance with the second lemma, given one VP9 MI unit mi with an MI unit size<8×8, the best MVPs of the MI unit mi are $mvp_{besti}$ and the sub-block MVPs of the MI unit mi are $mvp_{blkji}$, the sub-block MVP $mvp_{blk3i}$ must be equivalent to the best MVP $mvp_{besti}$. Note that 0≤i<2 and 0≤j<4 for VP9.

Figure 12:
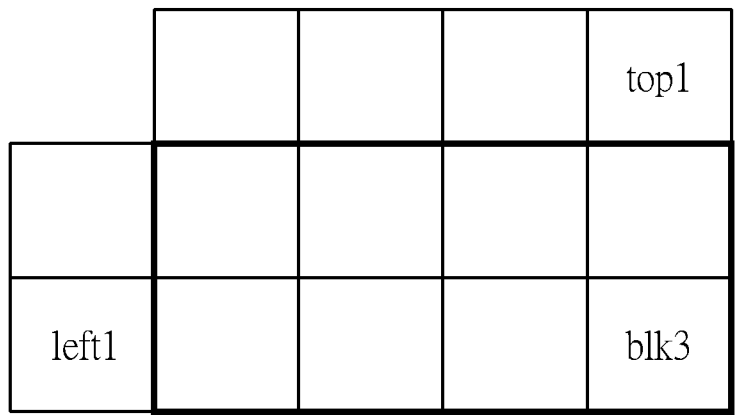
FIG. 12 is a diagram illustrating the best MVP determination performed for blocks with different MI unit sizes not smaller than 8×8.
Figure 12:
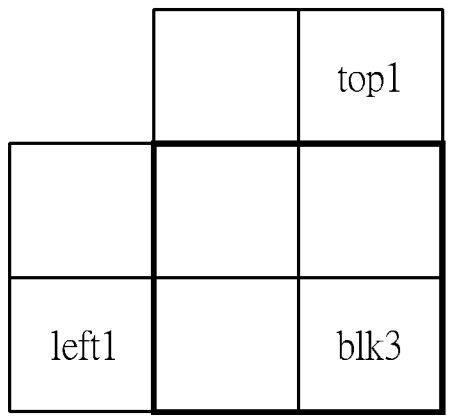

When the MI unit size is not smaller than 8×8, a best MVP is determined for a block, where the best MVP is used to calculate an MV for the block with the MI unit size≥8×8. When the MI unit size is smaller than 8×8, a best MVP is determined for each sub-block, and then at least one iteration of the sub-block MVP determination flow is performed to determine one sub-block MVP for each sub-block, where the best MVP and the sub-block MVP of each sub-block with the MI unit size<8×8 are used to calculate an MV for each sub-block. Since the minimum size of a sub-block is 4×4, the neighbors are stored in 4×4 units. However, the minimum MI unit size for the best MVP determination is 8×8. FIG. 12 is a diagram illustrating the best MVP determination performed for blocks with different MI unit sizes not smaller than 8×8. As shown in sub-diagram (A) of FIG. 12, the MI unit size is 16×8. The best MVP determination takes the 4×4 sub-block blk3 as a base, and refers to motion vector data of 4×4 neighbor units, including the motion vector data top1 of one top 4×4 neighbor unit (which is adjacent to the 16×8 block and closest to the 4×4 sub-block blk3 in the vertical direction) and the motion vector data left1 of one left 4×4 neighbor unit (which is adjacent to the 16×8 block and closest to the 4×4 sub-block blk3 in the horizontal direction). As shown in sub-diagram (B) of FIG. 12, the MI unit size is 8×8. Similarly, the best MVP determination takes the 4×4 sub-block blk3 as a base, and refers to motion vector data of 4×4 neighbor units, including the motion vector data top1 of one top 4×4 neighbor unit (which is adjacent to the 8×8 block and closest to the 4×4 sub-block blk3 in the vertical direction) and the motion vector data left1 of one left 4×4 neighbor unit (which is adjacent to the 8×8 block and closest to the 4×4 sub-block blk3 in the horizontal direction).

However, when the MI unit size is smaller than 8×8, the best MVPs for all sub-blocks within the same 8×8 block are the same. Specifically, the best MVP determined for an 8×8 block (which has the minimum MI unit size for the best MVP determination) can be used as the best MVP for each of the sub-blocks (e.g., four 4×4 sub-blocks, or two 4×8 sub-blocks, or two 8×4 sub-blocks) within the same 8×8 block. It should be noted that the best MVP of one 8×8 block (e.g., $BK_{CUR}$ shown in FIG. 4) may be determined on the basis of the motion vector data top1 of the neighbor unit 402 in the neighbor block $BK_0$, the motion vector data left1 of the neighbor unit 412 in the neighbor block $BK_1$, the motion vector data $nb_2$ of the neighbor unit 422 in the neighbor block $BK_2$, the motion vector data $nb_3$ of the neighbor unit 423 in the neighbor block $BK_3$, the motion vector data $nb_4$ of the neighbor unit 424 in the neighbor block $BK_4$, the motion vector data $nb_5$ of the neighbor unit 425 in the neighbor block $BK_5$, the motion vector data $nb_6$ of the neighbor unit 426 in the neighbor block $BK_6$, and the motion vector data $nb_7$ of the neighbor unit 427 in the neighbor block $BK_7$. Hence, the best MVP determined for one 8×8 block is the same as the sub-block MVP determined for the 4×4 sub-block blk3 within this 8×8 block. With regard to the second exemplary implementation employing the second lemma, the MVP determination apparatus 122 may assign the best MVP determined for one 8×8 block to one 4×4 sub-block (e.g., blk3) within the 8×8 block.

Figure 13:
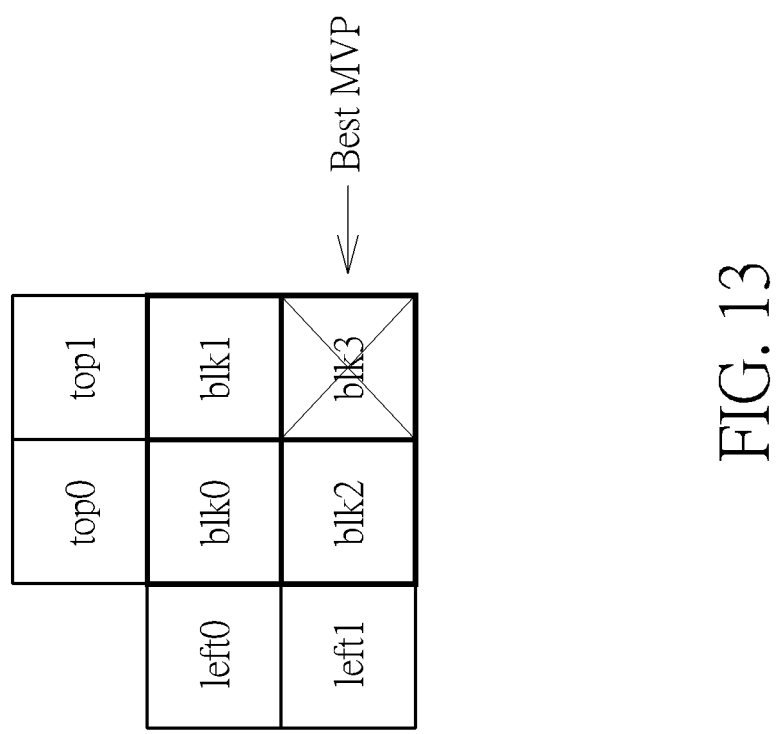
FIG. 13 is diagram illustrating a case where the second lemma is employed when the MI unit size is smaller than 8×8 according to embodiments of the present invention.

FIG. 13 is diagram illustrating a case where the second lemma is employed when the MI unit size is smaller than 8×8 according to embodiments of the present invention. In this example, the MI unit size is 4×4, and the sub-block MVP of the 4×4 sub-block blk3 within an 8×8 block can be directly set by the best MVP determined for the 8×8 block. Hence, an iteration of the sub-block MVP determination flow to compute the sub-block MVP of the 4×4 sub-block blk3 can be skipped or early terminated to reduce the computation load as well as the computation time.

With regard to the second exemplary implementation that employs the second lemma to efficiently improve the speed of the MVP determination, the numbers of iterations of sub-block MVP determination flow under different MI unit sizes are listed in the following table.

TABLE 3

| MI Unit Size | Conventional design | Proposed Design |
|---|---|---|
| MI = 4 × 8 | 2 | 2 |
| MI = 8 × 4 | 2 | 2 |
| MI = 4 × 4 | 4 | 3 |

It should be noted that the first lemma and the second lemma can be exploited simultaneously to reduce the number of iterations of sub-block MVP determination flow in a more efficient manner. This also falls within the scope of the present invention.

Figure 14:
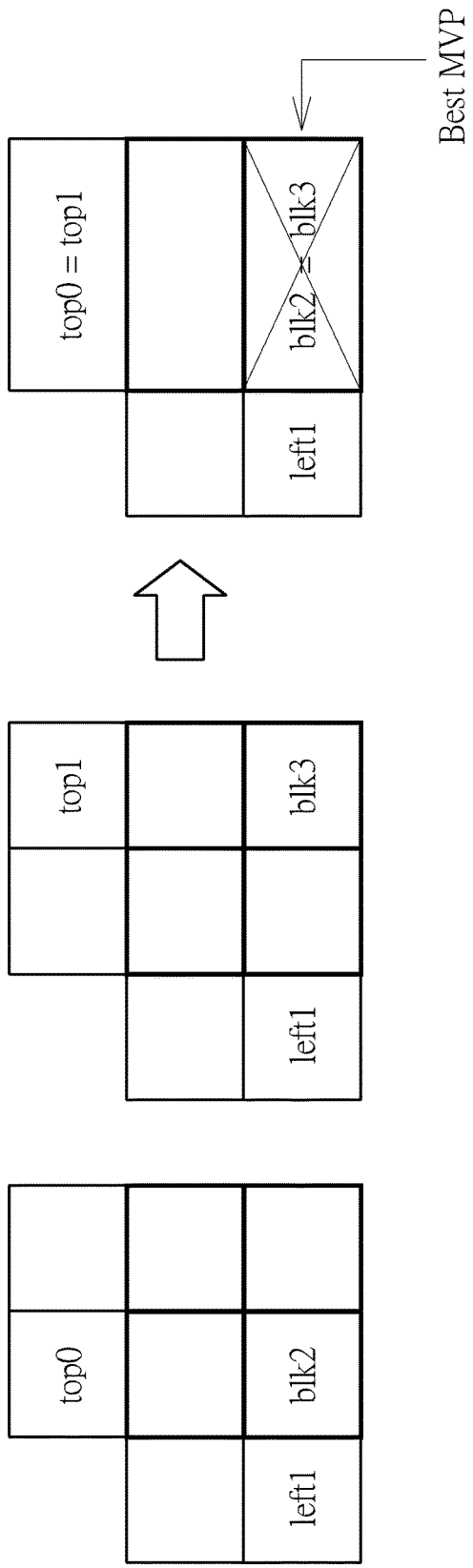
FIG. 14 is a diagram illustrating a case where the second lemma is employed and the condition of the first lemma is satisfied for two 4×4 sub-blocks within the same 8×8 block according to an embodiment of the present invention.

FIG. 14 is a diagram illustrating a case where the second lemma is employed and the condition of the first lemma is satisfied for two 4×4 sub-blocks within the same 8×8 block according to an embodiment of the present invention. When the checking circuit 124 determines that the motion vector data top0 and the motion vector data top1 are identical to each other, the condition of the first lemma for the 4×4 sub-blocks blk2 and blk3 is satisfied, which means that the sub-block MVP of the sub-block blk2 should be the same as the sub-block MVP of the sub-block blk3. Further, when the second lemma is employed, the best MVP of an 8×8 block should be the same as the sub-block MVP of the 4×4 sub-block blk3 within the 8×8 block. Hence, two iterations of the sub-block MVP determination flow to compute the sub-block MVPs of the 4×4 sub-blocks blk2 and blk3 can be skipped or early terminated to reduce the computation load as well as the computation time.

Figure 15:
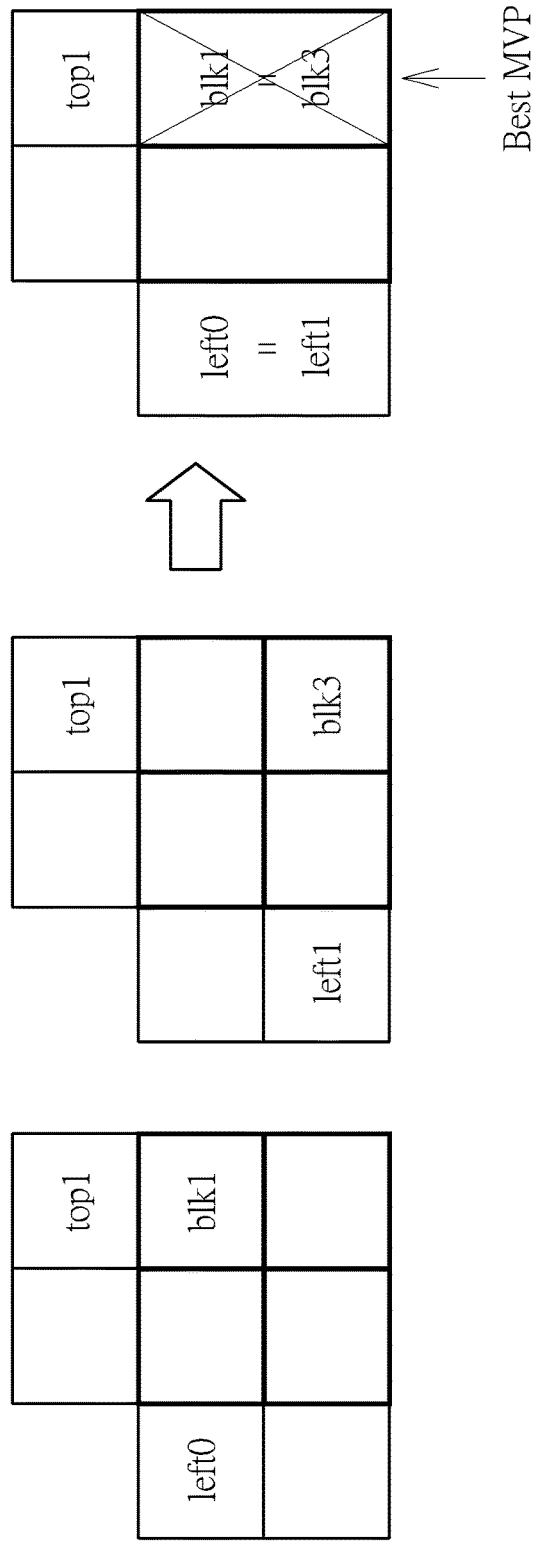
FIG. 15 is a diagram illustrating another case where the second lemma is employed and the condition of the first lemma is satisfied for two 4×4 sub-blocks within the same 8×8 block according to an embodiment of the present invention.

FIG. 15 is a diagram illustrating another case where the second lemma is employed and the condition of the first lemma is satisfied for two 4×4 sub-blocks within the same 8×8 block according to an embodiment of the present invention. When the checking circuit 124 determines that the motion vector data left0 and the motion vector data left1 are identical to each other, the condition of the first lemma for the 4×4 sub-blocks blk1 and blk3 is satisfied, which means that the sub-block MVP of the sub-block blk3 should be the same as the sub-block MVP of the sub-block blk1. Further, when the second lemma is employed, the best MVP of an 8×8 block should be the same as the sub-block MVP of the 4×4 sub-block blk3 within the 8×8 block. Hence, two iterations of the sub-block MVP determination flow to compute the sub-block MVPs of the 4×4 sub-blocks blk1 and blk3 can be skipped or early terminated to reduce the computation load as well as the computation time.

Figure 16:
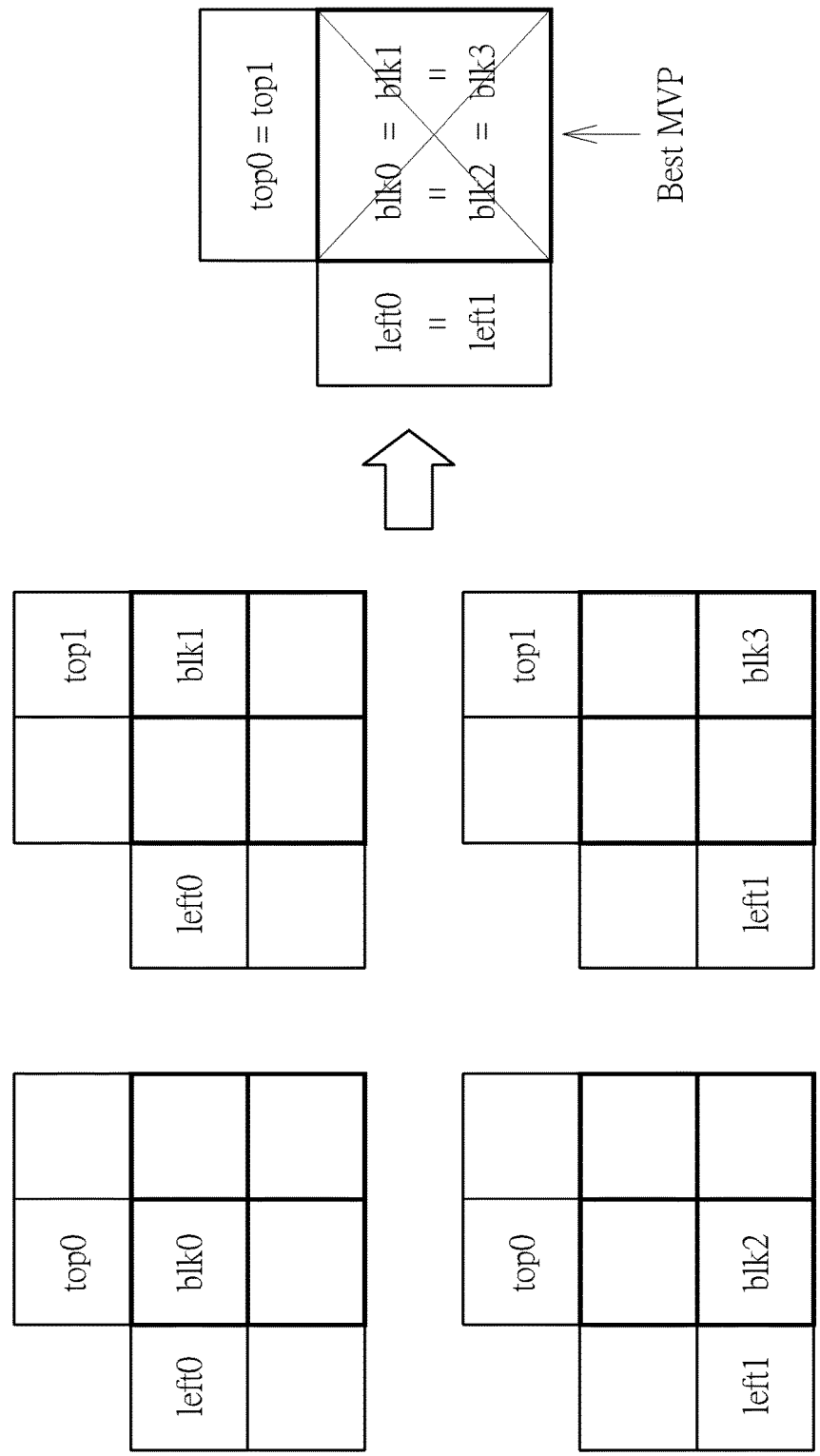
FIG. 16 is a diagram illustrating a case where the second lemma is employed and the condition of the first lemma is satisfied for all 4×4 sub-blocks within the same 8×8 block according to an embodiment of the present invention.

FIG. 16 is a diagram illustrating a case where the second lemma is employed and the condition of the first lemma is satisfied for all 4×4 sub-blocks within the same 8×8 block according to an embodiment of the present invention. When the checking circuit 124 determines that the motion vector data top0 and the motion vector data top1 are identical to each other and the motion vector data left0 and the motion vector data left1 are identical to each other, the condition of the first lemma for all sub-blocks blk0-blk3 is satisfied, which means that the sub-block MVPs of the sub-blocks blk0-blk3 should be the same. Further, when the second lemma is employed, the best MVP of an 8×8 block should be the same as the sub-block MVP of the sub-block blk3 within the 8×8 block. Hence, four iterations of the sub-block MVP determination flow to compute the sub-block MVPs of the 4×4 sub-blocks blk0-blk3 can be skipped or early terminated to reduce the computation load as well as the computation time.

Figure 17:
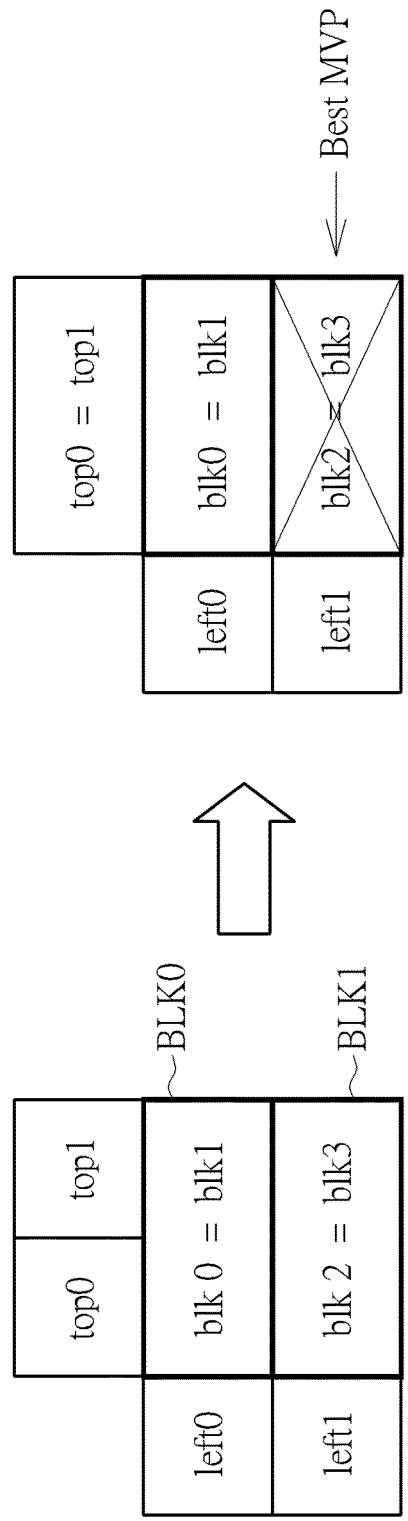
FIG. 17 is a diagram illustrating a case where the second lemma is employed and the condition of the first lemma is satisfied for two 4×4 sub-blocks within the same 8×4 sub-block according to an embodiment of the present invention.

FIG. 17 is a diagram illustrating a case where the second lemma is employed and the condition of the first lemma is satisfied for two 4×4 sub-blocks within the same 8×4 sub-block according to an embodiment of the present invention. In this example, the MI unit size is 8×4. When the checking circuit 124 determines that the motion vector data top0 and the motion vector data top1 are identical to each other, the condition of the first lemma for the 4×4 sub-blocks blk2 and blk3 within the 8×4 sub-block BLK1 is satisfied, which means that the sub-block MVP of the sub-block blk2 should be the same as the sub-block MVP of the sub-block blk3. Further, when the second lemma is employed, the best MVP of an 8×8 block should be the same as the sub-block MVP of the 4×4 sub-block blk3 within the 8×8 block. It should be noted that the sub-block MVP of the 8×4 sub-block BLK1 is set by the sub-block MVP of the 4×4 sub-block blk2 within the 8×4 sub-block BLK1. Hence, one iteration of the sub-block MVP determination flow to compute the sub-block MVP of the 8×4 sub-block BLK1 can be skipped or early terminated to reduce the computation load as well as the computation time.

Figure 18:
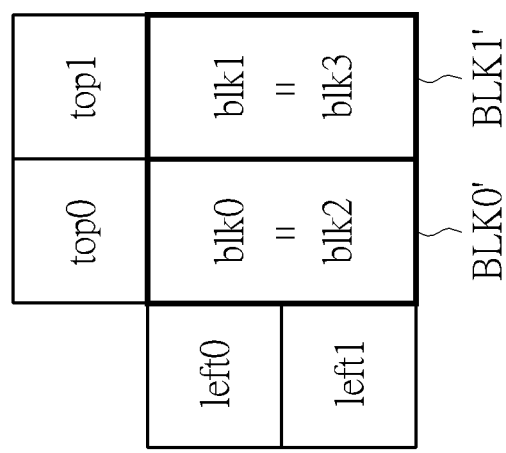
FIG. 18 is a diagram illustrating a case where the second lemma is employed and the condition of the first lemma is satisfied for two 4×4 sub-blocks within the same 4×8 sub-block according to an embodiment of the present invention.
Figure 18:
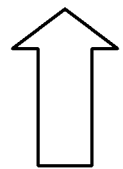
Figure 18:
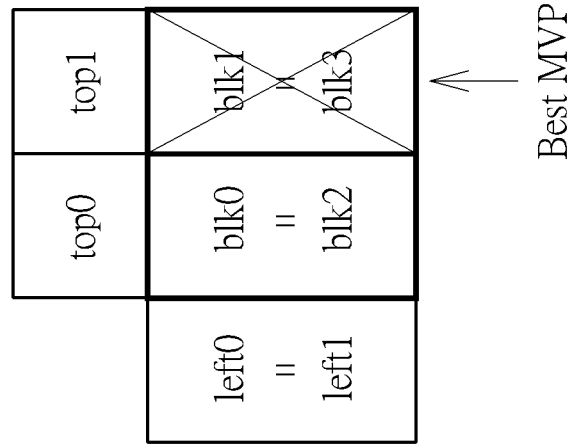

FIG. 18 is a diagram illustrating a case where the second lemma is employed and the condition of the first lemma is satisfied for two 4×4 sub-blocks within the same 4×8 sub-block according to an embodiment of the present invention. In this example, the MI unit size is 4×8. When the checking circuit 124 determines that the motion vector data left0 and the motion vector data left1 are identical to each other, the condition of the first lemma for the 4×4 sub-blocks blk1 and blk3 within the same 4×8 sub-block BLK1' is satisfied, which means that the sub-block MVP of the sub-block blk1 should be the same as the sub-block MVP of the sub-block blk3. Further, when the second lemma is employed, the best MVP of an 8×8 block should be the same as the sub-block MVP of the 4×4 sub-block blk3 within the 8×8 block. It should be noted that the sub-block MVP of the 4×8 sub-block BLK1' is set by the sub-block MVP of the 4×4 sub-block blk1 within the 4×8 sub-block BLK1'. Hence, one iteration of the sub-block MVP determination flow to compute the sub-block MVP of the 4×8 sub-block BLK1' can be skipped or early terminated to reduce the computation load as well as the computation time.

Figure 19:
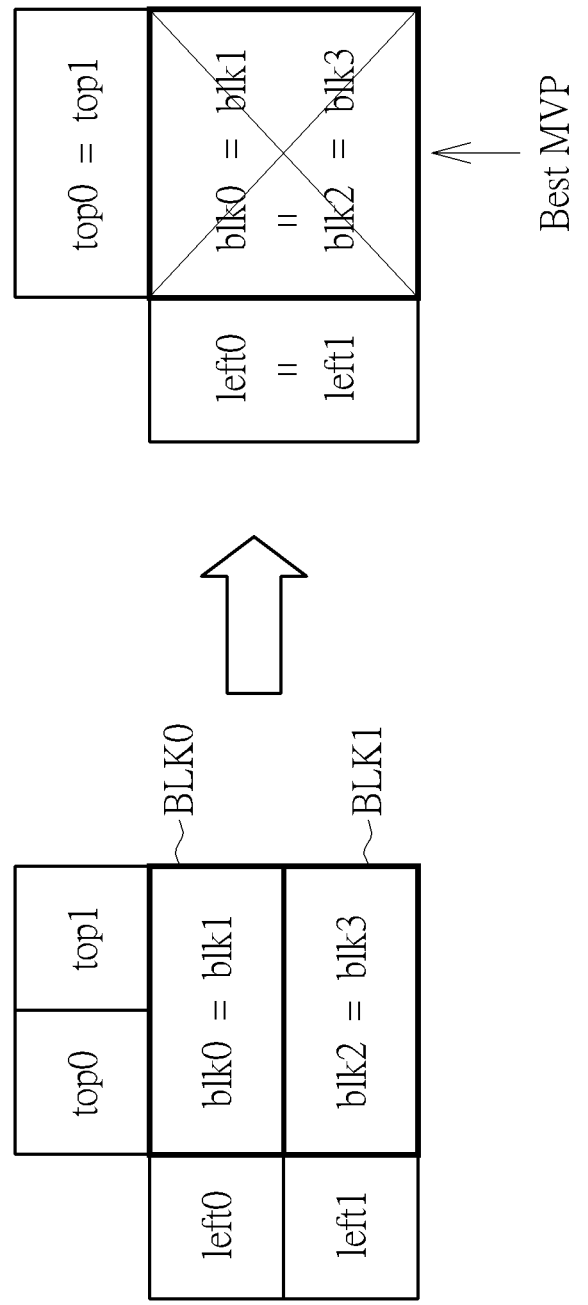
FIG. 19 is a diagram illustrating a case where the second lemma is employed, the condition of the first lemma is satisfied for two 4×4 sub-blocks within the same 8×4 block and the condition of the first lemma is satisfied for two 8×4 sub-blocks within the same 8×8 block according to an embodiment of the present invention.

FIG. 19 is a diagram illustrating a case where the second lemma is employed, the condition of the first lemma is satisfied for two 4×4 sub-blocks within the same 8×4 block and the condition of the first lemma is satisfied for two 8×4 sub-blocks within the same 8×8 block according to an embodiment of the present invention. In this example, the MI unit size is 8×4. When the checking circuit 124 determines that the motion vector data left0 and the motion vector data left1 are identical to each other, the condition of the first lemma for the 8×4 sub-blocks BLK0 and BLK1 is satisfied, which means that the sub-block MVP of the 8×4 sub-block BLK1 (i.e., the sub-block MVP of the 4×4 sub-block blk2) should be the same as the sub-block MVP of the 8×4 sub-block BLK0 (i.e., the sub-block MVP of the 4×4 sub-block blk0). When the checking circuit 124 determines that the motion vector data top0 and the motion vector data top1 are identical to each other, the condition of the first lemma for the 4×4 sub-blocks blk2 and blk3 within the same 8×4 sub-block BLK1 is satisfied, which means that the sub-block MVP of the sub-block blk2 should be the same as the sub-block MVP of the sub-block blk3. Further, when the second lemma is employed, the best MVP of an 8×8 block should be the same as the sub-block MVP of the 4×4 sub-block blk3 within the 8×8 block. Hence, two iterations of the sub-block MVP determination flow to compute the sub-block MVPs of the 8×4 sub-blocks BLK0 and BLK1 can be skipped or early terminated to reduce the computation load as well as the computation time.

Figure 20:
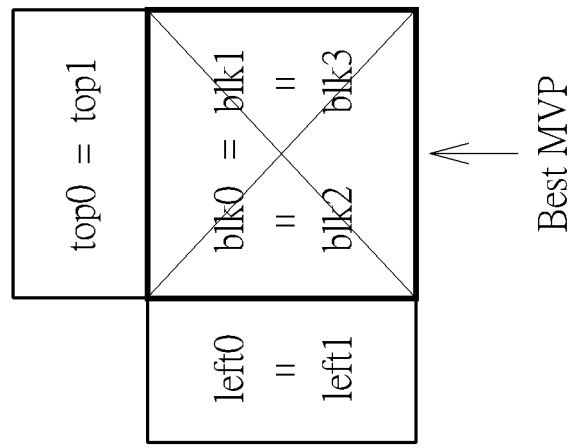
FIG. 20 is a diagram illustrating a case where the second lemma is employed, the condition of the first lemma is satisfied for two 4×4 sub-blocks within the same 4×8 block and the condition of the first lemma is satisfied for two 4×8 sub-blocks within the same 8×8 block according to an embodiment of the present invention.
Figure 20:
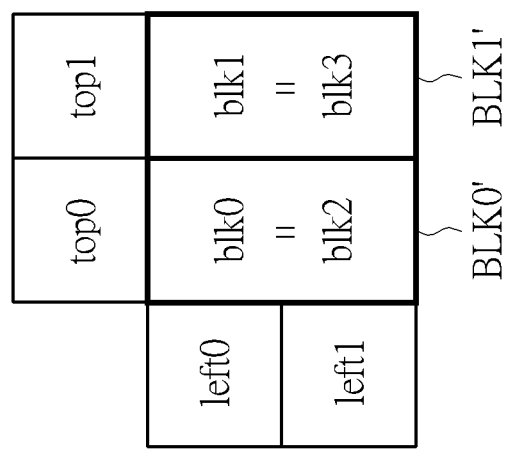

FIG. 20 is a diagram illustrating a case where the second lemma is employed, the condition of the first lemma is satisfied for two 4×4 sub-blocks within the same 4×8 block and the condition of the first lemma is satisfied for two 4×8 sub-blocks within the same 8×8 block according to an embodiment of the present invention. In this example, the MI unit size is 4×8. When the checking circuit 124 determines that the motion vector data top0 and the motion vector data top1 are identical to each other, the condition of the first lemma for the 4×8 sub-blocks BLK0' and BLK1' is satisfied, which means that the sub-block MVP of the 4×8 sub-block BLK1' (i.e., the sub-block MVP of the 4×4 sub-block blk1) should be the same as the sub-block MVP of the 4×8 sub-block BLK0' (i.e., the sub-block MVP of the 4×4 sub-block blk0). When the checking circuit 124 determines that the motion vector data left0 and the motion vector data left1 are identical to each other, the condition of the first lemma for the 4×4 sub-blocks blk1 and blk3 within the same 4×8 sub-block BLK1' is satisfied, which means that the sub-block MVP of the sub-block blk1 should be the same as the sub-block MVP of the sub-block blk3. Further, when the second lemma is employed, the best MVP of an 8×8 block should be the same as the sub-block MVP of the 4×4 sub-block blk3 within the 8×8 block. Hence, two iterations of the sub-block MVP determination flow to compute the sub-block MVPs of the 4×8 sub-blocks BLK0' and BLK1' can be skipped or early terminated to reduce the computation load as well as the computation time.

With regard to a third exemplary implementation that employs both of the first lemma and the second lemma to more efficiently improve the speed of the MVP determination, the numbers of iterations of sub-block MVP determination flow under different MI unit sizes and different cases are listed in the following table.

TABLE 4

| MI Unit Size | Conventional design | Proposed Design (Case 1: top0 = top1 & left0 ≠ left1) | Proposed Design (Case 2: left0 = left1 & top0 ≠ top1) | Proposed Design (Case 3: top0 = top1 & left0 = left1) |
| --- | --- | --- | --- | --- |
| MI = 4 × 8 | 2 | 1 | 1 | 0 |
| MI = 8 × 4 | 2 | 1 | 1 | 0 |
| MI = 4 × 4 | 4 | 1 | 1 | 0 |

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion vector predictor determination method comprising:
   utilizing a checking circuit for checking if motion vector data of at least one first neighbor unit adjacent to a block and motion vector data of at least one second neighbor unit adjacent to the block are identical to each other; and
   when a checking result indicates that the motion vector data of the at least one first neighbor unit is identical to the motion vector data of the at least one second neighbor unit, assigning a motion vector predictor determined for a first sub-block within the block to a second sub-block within the block;
   wherein the motion vector data of the at least one first neighbor unit is involved in determining the motion vector predictor of the first sub-block, and the motion vector data of the at least one second neighbor unit is not involved in determining the motion vector predictor of the first sub-block;
   wherein at least a portion of the at least one first neighbor unit and at least a portion of the at least one second neighbor unit are located at a same row of a frame, at least a portion of the first sub-block and at least a portion of the second sub-block are located at a same row of the frame, at least a portion of the at least one first neighbor unit and at least a portion of the first sub-block are located at a same column of the frame, and at least a portion of the at least one second neighbor unit and at least a portion of the second sub-block are located at a same column of the frame; or at least a portion of the at least one first neighbor unit and at least a portion of the at least one second neighbor unit are located at a same column of the frame, at least a portion of the first sub-block and at least a portion of the second sub-block are located at a same column of the frame, at least a portion of the at least one first neighbor unit and at least a portion of the first sub-block are located at a same row of the frame, and at least a portion of the at least one second neighbor unit and at least a portion of the second sub-block are located at a same row of the frame.

2. The method of claim 1, wherein one of the at least one first neighbor unit and one of the at least one second neighbor unit are on a same side of the block.

3. The method of claim 2, wherein the same side is a top side of the block.

4. The method of claim 2, wherein the same side is a left side of the block.

5. The method of claim 1, wherein the first sub-block and the second sub-block have a same size.

6. The method of claim 5, wherein the at least one first neighbor unit and the at least one second neighbor unit have a same size; and a size of each of the first sub-block and the second sub-block is equal to a size of each of the at least one first neighbor unit and the at least one second neighbor unit.

7. The method of claim 6, wherein each of the first sub-block, the second sub-block, the at least one first neighbor unit and the at least one second neighbor unit is square.

8. The method of claim 5, wherein the first neighbor unit and the second neighbor unit have a same size; and a size of each of the first sub-block and the second sub-block is larger than a size of each of the at least one first neighbor unit and the at least one second neighbor unit.

9. The method of claim 8, wherein each of the first sub-block and the second sub-block is non-square, and each of the at least one first neighbor unit and the at least one second neighbor unit is square.

10. A motion vector predictor determination apparatus comprising:
   a checking circuit, arranged to check if motion vector data of at least one first neighbor unit adjacent to a block and motion vector data of at least one second neighbor unit adjacent to the block are identical to each other; and
   a motion vector predictor computing circuit, arranged to assign a motion vector predictor determined for a first sub-block within the block to a second sub-block within the block when the checking circuit determines that the motion vector data of the at least one first neighbor unit is identical to the motion vector data of the at least one second neighbor unit, wherein the motion vector data of the at least one first neighbor unit is involved in determining the motion vector predictor of the first sub-block, and the motion vector data of the at least one second neighbor unit is not involved in determining the motion vector predictor of the first sub-block;
   wherein at least a portion of the at least one first neighbor unit and at least a portion of the at least one second neighbor unit are located at a same row of a frame, at least a portion of the first sub-block and at least a portion of the second sub-block are located at a same row of the frame, at least a portion of the at least one first neighbor unit and at least a portion of the first sub-block are located at a same column of the frame, and at least a portion of the at least one second neighbor unit and at least a portion of the second sub-block are located at a same column of the frame; or at least a portion of the at least one first neighbor unit and at least a portion of the at least one second neighbor unit are located at a same column of the frame, at least a portion of the first sub-block and at least a portion of the second sub-block are located at a same column of the frame, at least a portion of the at least one first neighbor unit and at least a portion of the first sub-block are located at a same row of the frame, and at least a portion of the at least one second neighbor unit and at least a portion of the second sub-block are located at a same row of the frame.

* * * * *